(12) United States Patent
Morandi et al.

(10) Patent No.: US 10,078,826 B2
(45) Date of Patent: *Sep. 18, 2018

(54) DIGITAL POINT-OF-SALE ANALYZER

(71) Applicant: Accenture Global Services Limited, Dublin 4 (IE)

(72) Inventors: Simone Morandi, Monza (IT); Marco Dini, Milan (IT); Michele Sassano, Milan (IT); Pier Paolo Campari, Castelleone (IT); Andrew E. Fano, Lincolnshire, IL (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 521 days.

This patent is subject to a terminal disclaimer.

(21) Appl. No.: 14/796,709

(22) Filed: Jul. 10, 2015

(65) Prior Publication Data
US 2015/0317620 A1 Nov. 5, 2015

Related U.S. Application Data

(63) Continuation of application No. 12/839,135, filed on Jul. 19, 2010, now Pat. No. 9,135,491, which is a (Continued)

(30) Foreign Application Priority Data

Apr. 8, 2010 (IT) .................................. 10425110.3

(51) Int. Cl.
*G06Q 30/06* (2012.01)
*G06K 9/00* (2006.01)
(Continued)

(52) U.S. Cl.
CPC ............ *G06Q 20/203* (2013.01); *G06K 9/00* (2013.01); *G06Q 10/087* (2013.01); *G06Q 30/06* (2013.01)

(58) Field of Classification Search
CPC ............ G06Q 20/208; G06Q 30/0639; G06Q 30/0643; G06K 2017/0051;
(Continued)

(56) References Cited

U.S. PATENT DOCUMENTS 3,651,478 A 3/1972 Shandlay
4,493,105 A 1/1985 Beall et al.
(Continued)

FOREIGN PATENT DOCUMENTS

DE 10033652 A1 1/2002
EP 1030521 8/2000
(Continued)

OTHER PUBLICATIONS

European Patent Office, Search Report on "European Application No. 10014575.4" dated Jan. 17, 2013.
(Continued)

*Primary Examiner* — Florian M Zeender
*Assistant Examiner* — Dana Amsdell
(74) *Attorney, Agent, or Firm* — Mannava & Kang, P.C.

(57) ABSTRACT

A digital point-of-sale system for determining key performance indicators (KPIs) at a point-of-sale includes a product identification unit and a realogram creation unit. The product identification unit is configured to receive a captured image of a product display and to identify products in the captured image by comparing features determined from the captured image to features determined from products templates. The realogram creation unit is configured to create a realogram from the identified products and product templates. A product price KPI unit is configured to identify a product label proximally located to each identified product, and to recognize the product price on each product label. Each product price is compared to a predetermined range of prices to determine whether the product label proximally located to
(Continued)

the identified product is a correct product label for the identified product.

19 Claims, 8 Drawing Sheets

Related U.S. Application Data continuation-in-part of application No. 11/849,165, filed on Aug. 31, 2007, now Pat. No. 8,189,855, and a continuation-in-part of application No. 11/849,171, filed on Aug. 31, 2007, now Pat. No. 7,949,568, and a continuation-in-part of application No. 11/849,177, filed on Aug. 31, 2007, now Pat. No. 8,009,864, and a continuation-in-part of application No. 11/849,180, filed on Aug. 31, 2007, now Pat. No. 8,630,924.

(51) Int. Cl.
    *G06Q 20/20*     (2012.01)
    *G06Q 10/08*     (2012.01)
    *G06T 17/00*     (2006.01)

(58) Field of Classification Search
CPC ........... G06K 2209/01; G06K 9/00771; G06K 9/6201; G06K 9/6204; G06K 9/6267; G06K 9/00; G06T 2207/10004; G06T 2207/10116; G06T 2207/30108; G06T 7/0008; G06T 7/10; G06T 7/11; G06T 7/73; G06T 7/90; G06T 17/00
See application file for complete search history.

(56) References Cited

U.S. PATENT DOCUMENTS

| | | | |
|---|---|---|---|
| 4,797,819 | A | 1/1989 | Dechirot |
| 4,947,322 | A | 8/1990 | Tenma et al. |
| 5,383,111 | A | 1/1995 | Homma et al. |
| 5,465,115 | A | 11/1995 | Conrad et al. |
| 5,497,314 | A | 3/1996 | Novak |
| 5,511,134 | A | 4/1996 | Kuratomi |
| 5,671,362 | A * | 9/1997 | Cowe ............ G06Q 10/087 340/5.92 |
| 5,963,920 | A | 10/1999 | Rose et al. |
| 6,026,377 | A * | 2/2000 | Burke ............ G06Q 10/087 235/383 |
| 6,075,535 | A | 6/2000 | Fitzhugh |
| 6,204,763 | B1 | 3/2001 | Sone |
| 6,341,269 | B1 | 1/2002 | Delaney et al. |
| 6,549,891 | B1 | 8/2003 | Rauber et al. |
| 6,678,413 | B1 | 1/2004 | Liang et al. |
| 6,697,787 | B1 | 2/2004 | Miller |
| 6,705,522 | B2 | 3/2004 | Gershman et al. |
| 6,707,381 | B1 | 3/2004 | Maloney |
| 6,711,293 | B1 | 3/2004 | Lowe |
| 6,919,795 | B2 | 7/2005 | Roseen |
| 7,016,045 | B2 | 3/2006 | Kwon |
| 7,043,075 | B2 | 5/2006 | Gutta |
| 7,054,467 | B1 | 5/2006 | Honda |
| 7,100,824 | B2 | 9/2006 | Ostrowski et al. |
| 7,168,618 | B2 | 1/2007 | Schwartz |
| 7,245,221 | B2 | 7/2007 | Claudatos et al. |
| 7,245,558 | B2 | 7/2007 | Willins et al. |
| 7,246,745 | B2 | 7/2007 | Hudnut et al. |
| 7,290,707 | B2 | 11/2007 | Sawasaki |
| 7,334,729 | B2 | 2/2008 | Brewington |
| 7,356,495 | B2 | 4/2008 | Beigl et al. |
| 7,392,948 | B2 | 7/2008 | Smith et al. |
| 7,493,336 | B2 | 2/2009 | Noonan |
| 7,581,680 | B2 | 9/2009 | Knowles et al. |
| 7,588,188 | B2 | 9/2009 | Ciarlante et al. |
| 7,634,131 | B2 | 12/2009 | Nakajima et al. |
| 7,693,757 | B2 | 4/2010 | Zimmerman |
| 7,699,226 | B2 | 4/2010 | Smith et al. |
| 7,765,231 | B2 | 7/2010 | Rathus et al. |
| 7,792,709 | B1 | 9/2010 | Trandal et al. |
| 7,806,335 | B2 | 10/2010 | Knowles et al. |
| 7,844,080 | B2 | 11/2010 | Itoh |
| 7,853,100 | B2 | 12/2010 | Sundstrom et al. |
| 8,189,855 | B2 * | 5/2012 | Opalach ............ G06Q 10/087 382/100 |
| 2002/0109593 | A1 * | 8/2002 | Swartzel ............ G06Q 10/087 340/540 |
| 2002/0138374 | A1 | 9/2002 | Jennings et al. |
| 2002/0147597 | A1 | 10/2002 | Connors et al. |
| 2003/0154141 | A1 | 8/2003 | Capazario et al. |
| 2003/0164754 | A1 | 9/2003 | Roseen |
| 2003/0227392 | A1 | 12/2003 | Ebert et al. |
| 2004/0056091 | A1 | 3/2004 | Overhultz et al. |
| 2004/0095380 | A1 | 5/2004 | Bass et al. |
| 2004/0194129 | A1 | 9/2004 | Carlbom et al. |
| 2005/0060247 | A1 | 3/2005 | Tien |
| 2005/0168345 | A1 | 8/2005 | Swafford, Jr. et al. |
| 2005/0189412 | A1 | 9/2005 | Hudnut et al. |
| 2005/0213934 | A1 | 9/2005 | Kinjo |
| 2005/0234778 | A1 | 10/2005 | Sperduti et al. |
| 2006/0095331 | A1 | 5/2006 | O'Malley et al. |
| 2006/0149634 | A1 | 7/2006 | Pelegrin et al. |
| 2006/0155592 | A1 | 7/2006 | Burkert et al. |
| 2006/0164247 | A1 | 7/2006 | Overhultz et al. |
| 2006/0190341 | A1 | 8/2006 | Riley et al. |
| 2006/0214792 | A1 | 9/2006 | Goyal et al. |
| 2007/0069867 | A1 | 3/2007 | Fleisch et al. |
| 2007/0073641 | A1 | 3/2007 | Perry et al. |
| 2007/0100713 | A1 | 5/2007 | Del Favero et al. |
| 2007/0158417 | A1 | 7/2007 | Brewington |
| 2007/0179921 | A1 | 8/2007 | Zitnick et al. |
| 2007/0192294 | A1 | 8/2007 | Ramer et al. |
| 2007/0235465 | A1 | 10/2007 | Walker et al. |
| 2007/0250409 | A1 | 10/2007 | Levy |
| 2007/0260429 | A1 | 11/2007 | Vera et al. |
| 2008/0027838 | A1 | 1/2008 | Sawasaki |
| 2008/0077511 | A1 | 3/2008 | Zimmerman |
| 2008/0103939 | A1 | 5/2008 | Gibb |
| 2008/0140478 | A1 | 6/2008 | Goldberg et al. |
| 2008/0144934 | A1 | 6/2008 | Raynaud |
| 2008/0215462 | A1 | 9/2008 | Sorensen et al. |
| 2008/0306787 | A1 | 12/2008 | Hamilton et al. |
| 2009/0059270 | A1 * | 3/2009 | Opalach ............ G06K 9/00 358/1.15 |
| 2009/0060349 | A1 | 3/2009 | Linaker et al. |
| 2009/0063306 | A1 | 3/2009 | Fano et al. |
| 2009/0063307 | A1 | 3/2009 | Groenovelt et al. |
| 2009/0072029 | A1 | 3/2009 | Martin |
| 2009/0094140 | A1 | 4/2009 | Kwan |
| 2009/0106037 | A1 | 4/2009 | Harindranath |
| 2009/0114575 | A1 | 5/2009 | Carpenter et al. |
| 2009/0121017 | A1 | 5/2009 | Cato |
| 2009/0160975 | A1 | 6/2009 | Kwan |
| 2009/0192921 | A1 * | 7/2009 | Hicks ............ G06F 3/0312 705/28 |
| 2009/0204512 | A1 | 8/2009 | Connell, II |
| 2009/0248198 | A1 | 10/2009 | Siegel et al. |
| 2010/0061595 | A1 | 3/2010 | Baan et al. |
| 2010/0070388 | A1 | 3/2010 | Spindler et al. |
| 2010/0086192 | A1 | 4/2010 | Grigsby et al. |
| 2010/0092035 | A1 | 4/2010 | Murdter |
| 2010/0122283 | A1 | 5/2010 | Button |
| 2010/0169189 | A1 | 7/2010 | Allison et al. |
| 2010/0217678 | A1 | 8/2010 | Goncalves |

FOREIGN PATENT DOCUMENTS

| | | |
|---|---|---|
| EP | 2103891 | 9/2009 |
| JP | 2001-088912 | 4/2001 |
| JP | 2001-128814 | 5/2001 |
| JP | -2010063748 A * | 3/2010 |
| JP | 2010063748 A * | 3/2010 |
| WO | 0201529 | 1/2002 |

(56) References Cited

FOREIGN PATENT DOCUMENTS

| WO | 2008029159 | 3/2008 |
|----|------------|--------|
| WO | 2009/027839 | 3/2009 |
| WO | 2009/027842 | 3/2009 |

OTHER PUBLICATIONS

Hoekman et al., "Development, Trade, and the WTO: A Handbook", World Bank Publications, published 2002, 4 pages.
Canadian Intellectual Property Office, "Search Report on Canadian Patent Application No. 2,720,217", dated Dec. 22, 2014, 8 pages.
"Smart carts, Veggie Vision in grocery stores to come", http://usatoday30.usatoday.com/tech/news/techinnovations/2003-09-26-future-grocery-shop_x.htm.
Zitnick et al., "Object Instance Recognition Using triplets of Feature Symbols", 2007.
Merler et al., "Recognizing Groceries in Situ Using in Vitro Training Data", Jun 17, 2007.
Kulyukin et al., "RoboCart: Toward Robot-Assisted Navigation of Grocery Stores by the Visually Impaired", Aug. 2, 2005.
Schechter, Bruce, "Green Machine", Think Research, www.domino.watson.ibm.com/comm/wwwr_thinkresearch.nsf/pages/machine399.html <downloaded date Jan. 14, 2008>, 3 pages.
"Welcome to Pro Corp", http://www.pro-corp.com/rpt_oos.html, downloaded date Jul. 26, 2007, 7 pages.

* cited by examiner

DIGITAL POINT-OF-SALE ANALYZER

PRIORITY

This application is a continuation of U.S. patent application Ser. No. 12/839,135, filed on Jul. 19, 2010, which claims priority to Italian patent application Ser. No. 10 425 110.3, filed on Apr. 8, 2010, and entitled "Digital Point-of-Sale Analyzer", which is incorporated by reference in its entirety. This application also claims priority to U.S. patent application Ser. No. 11/849,165, filed on Aug. 31, 2007, and entitled "Planogram Extraction Based Image Processing", which is incorporated by reference in its entirety. This application also claims priority to U.S. patent application Ser. No. 11/849,171, filed on Aug. 31, 2007, and entitled "Determination of product display Parameters Based on Image Processing", which is incorporated by reference in its entirety. This application also claims priority to U.S. patent application Ser. No. 11/849,177, filed on Aug. 31, 2007, and entitled "Determination of Inventory Conditions Based on Image Processing", which is incorporated by reference in its entirety. This application also claims priority to U.S. patent application Ser. No. 11/849,180, filed on Aug. 31, 2007, and entitled "Detection of Stock Out Conditions Based Image Processing", which is incorporated by reference in its entirety.

BACKGROUND

Companies marketing consumer goods are increasing their focus on point-of-sale analysis in order to identify new marketing strategies and winning business models. Companies marketing consumer goods are also increasing their focus on point-of-sale monitoring to ensure retailers are complying with their marketing strategies and guidelines.

One of the key challenges facing these companies is determining how to evaluate their marketing initiatives at the point-of-sale since there is no common strategy or structured approach to data collection at the point-of sale and for data analysis of the collected data. Moreover, strategies that are currently used that include data collection at the point-of-sale tend to be expensive and time-consuming and the quality of the data collected is poor. Furthermore, ensuring compliance with marketing strategies and guidelines becomes problematic when agents who conduct point-of-sale audits must verify numerous displays in various locations.

SUMMARY OF THE INVENTION

The instant application describes methods and systems for digital point-of-sale analysis in which at least one captured image of a product display is received including a plurality of products. Each of the plurality of products in the at least one captured image is identified by comparing features determined from the at least one captured image and features determined from a plurality of product templates to determine a matching product template. A realogram is generated from the identified plurality of products and product templates, wherein the realogram includes an electronically-generated diagram of the product display. A product label proximally located to each identified product from the realogram is identified, the product price on each product label is recognized, each product price is compared to a predetermined range of prices for each identified product, and it is determined whether the product label proximally located to each identified product is a correct product label for the identified product based on the comparison. Thus, companies may be able to ensure compliance with marketing strategies and guidelines.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments. Also, the embodiments may be used in combination with each other.

Figure 1:
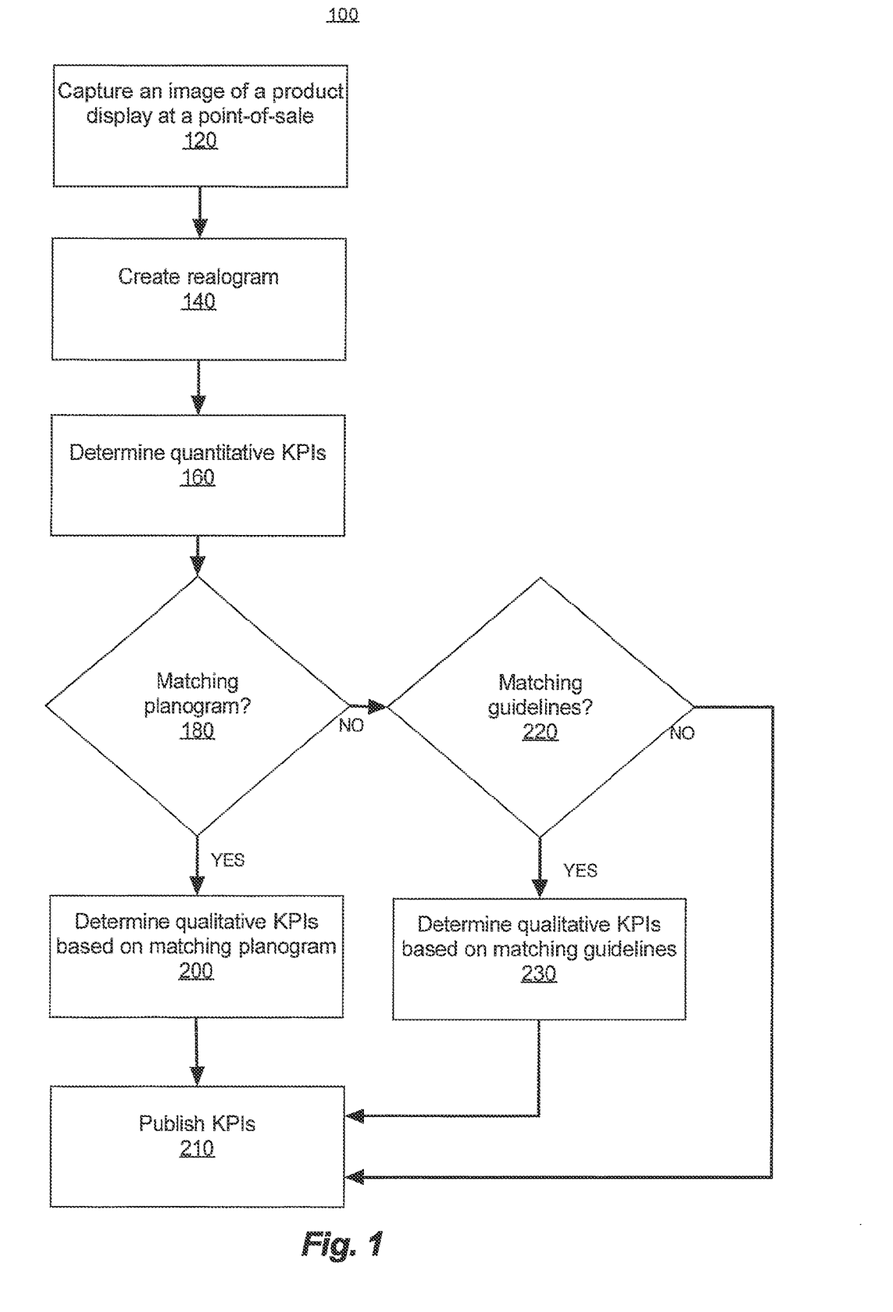
FIG. 1 illustrates a method, according to an embodiment.

FIG. 1 illustrates a method 100 for analyzing product displays at a point-of-sale, according to an embodiment. At step 120, one or more images of a product display at a point-of-sale are captured by an image capture device. A point-of-sale may be any location where a product is displayed and/or purchased. A single image may be used if it can capture the entire point-of-sale area to be analyzed and still maintain the detail of the image needed for recognizing product details. Multiple images may also be used to capture the entire point-of-sale area to be analyzed. These images are then seamed together to generate a realogram and perform other analysis. According to an embodiment, the seaming together of images may include analyzing two or more images and identifying a product that is present in both images. A difference in position of the identified product is determined in each of the images. Based on the position information, the images are aligned and merged, so products and other product information can be recognized from the seamed image and for generating the merged realogram. Merging images may also occur when a realogram is created, as further explained below.

According to an embodiment, the image capture device is a digital camera. The digital camera may be incorporated in a mobile device, such as a mobile phone, PDA or another handheld device that can wirelessly transmit the images to a remote computer system, which may include an image processing server. The image capture device may also be a still camera or video camera mounted to have a fixed view of the product display at the point-of-sale. The still or video camera may be connected to a computer system that stores the images, and that may transmit the images to the remote computer system for image analysis. Metadata including information such as point-of-sale data, location information (e.g. global positioning system (GPS) coordinates, and image capture date and time are collected as well. The captured image and the associated metadata are then sent to the remote computer system.

At step 140, the image processing server at the remote computer system creates a realogram from the one or more captured images of step 120. A realogram is an electronically-generated diagram of a point-of-sale. The realogram may include products, out-of-stocks (which may be spaces where products can be located), shelves and additional product information captured by the one or more images (e.g. product labels and prices). The image processing server performs image analysis on the one or more captured images to create the realogram. To create the realogram, the products, out-of-stocks and shelves are identified by the image processing server from the one or more images. The step 140 of creating a realogram is now described in detail with respect to steps 142-152 of FIG. 2, which are sub-steps of the step 140.

Figure 2:
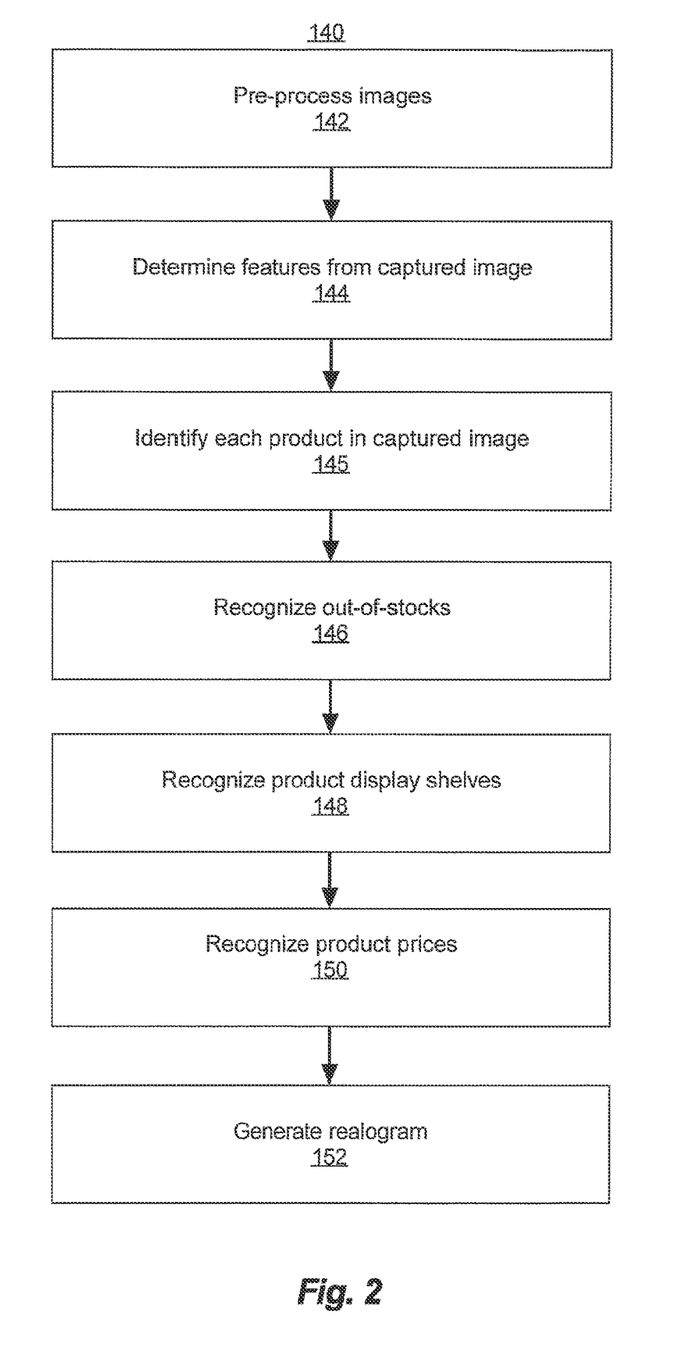
FIG. 2 illustrates a method of creating a realogram, according to an embodiment.

In FIG. 2, at step 142, each captured image is pre-processed. This step includes noise filtering (low-pass pyramidal filtering) to remove possible artifacts, focus analysis to filter out the bad quality images from the good quality pictures and image rectification to remove the perspective of the images.

At step 144, a list of features describing products in each captured image is determined. The features describing a particular product may include contrast, border, color, edges, text, etc.

At step 145, products in each captured image are identified from the list of features determined at step 144 and product templates. A product template for a product may include identifying details for the product. The template may be a forward-facing template. For example, assume the product is placed on the shelf so the front of the product package is facing out. The product template may include identifying details for the front of the product package. The list of features determined from the captured image may be compared to a list of features for each product template in a data store until a matching product template is found, i.e. until the product is recognized by matching the captured image to a product template. Also, the estimation of product scale (i.e. a ratio between product linear dimensions in meters or other units and the same dimensions measured in image pixels) is calculated leveraging the scale invariance of features. This technique helps to identify instances of products in captured images, despite changes in scale, viewpoint and lighting conditions. If, however, the product is not fully identified based on the determined features and product scale, the image processing server applies an additional technique to identify the product in the images, such as the color matching or edge detection.

Additionally, a parameter associated with each feature describes a threshold of values for the feature. The appropriate parameters, i.e. the appropriate values, for each feature are initialized for each product by setting values of the threshold for the parameter, running the feature detection as discussed above and determining if the product is recognized. If the product has been recognized correctly, the values of the parameters are saved as initialized parameters for future use. For example, if a feature describing a product such as contrast is determined at step 144, a parameter associated with the contrast feature for the product in the image may be a threshold of values (e.g. the contrast for the product in the image may be between −53 and −45). If the product is later identified at step 145, the threshold of values are saved as an initialized parameter for future use. In some instances, a matching template is not found for a product. In these instances, the product may be indicated as unidentifiable, and a template may be created. Also, the unidentifiable product may be shown in outline form in the realogram to illustrate its location in the point-of-sale.

At the end of step 145, a validation step may be performed for each matching product template to determine whether to indicate a product has been identified from the captured image. As discussed above, the image processing server attempts to identify each of the products in the captured image by matching each product to a product template. If more than one product is found on the same area of the image, a color analysis is performed in order to distinguish and select the correct product. The technique is based on color comparison of several areas of the recognized product using product color descriptions. The matching product color description identifies the correct product to recognize.

At step 146, out-of-stocks, if present, are recognized by evaluating a local luminance mean and standard deviation of each image.

At step 148, product display shelves, if present, are recognized by analyzing a vertical and horizontal gradient of each image. Shelf recognition identifies each shelf in an image. Therefore, it is possible to determine on which shelf a product is located.

At step 150, product prices are recognized. Once the image is analyzed and products, shelves, products prices and out-of-stocks are identified, a realogram of the product display is generated at step 152 from this information.

To recognize and validate product prices, which may be performed at step 150, the image processing server identifies each product label proximally located to each identified product and implements an optical character recognition (OCR) technique in order to identify the price on each product label in the product display. In order to enhance the recognition level of the product price using the OCR technique, a preliminary image restoration and image white balance technique may be performed.

In order to determine whether the product label identified as proximally located to each identified product is the correct product label for the product, the price determined by the OCR technique is compared to a predetermined range of prices for the product. A correct product label for an identified product is the label that describes the identified product rather than a different product, which may be located next to the identified product. The product label may include a price, bar code identifier, product description, etc. The predetermined range of prices may be a range provided by the retailer or other entity. The range may be determined from historic prices for the product. If the price determined by the OCR technique falls within the predetermined range of prices for the product, the product label identified as proximally located to the identified product is considered the correct product label for the identified product. Then, the price determined from the OCR of the correct product label is determined to be the price of the corresponding product. Additionally, if a barcode is displayed on the product label, a product ID, such as a stock-keeping unit (SKU) or a European article number (EAN), stored in the barcode may be used to identify whether the product label proximally located to the identified product is the correct product label for the identified product.

Several key performance indicators (KPI)s are determined from the determined product features. A product price monitoring KPI is one KPI determined from the product label for a product. The product price monitoring KPI indicates whether a price on a product label is the correct price. For example, a price on a product label may not be updated even if there is a price change for the product. The product price monitoring KPI indicates whether a correct price is provided on the label for the product. In order to determine if the price on the product label for the product is correct, price validation is carried out by comparing the price determined from the label to one or more prices for the figure. Ideally, the remote computer system receives the correct price for the product, for example, from the retailer. Then, the remote computer system can determine whether the price on the product label is the same as the correct price received from the retailer. If price changes are done weekly, then the retailer should provide the price updates on a weekly basis. In other instances, the retailer may not provide the correct prices periodically. In these instances, the price determined from the product label may be compared to a set of historic prices for the particular product. The set of prices may be based on previous image captures of the same product. The set of prices may include a range of prices. For example, if the price change is weekly, the price from the last week may be used as a midpoint for the range. The upper and lower end of the range may be based on narrow tolerances derived from percent changes in price over several weeks. Note that the range used for price validation may be narrower than the range used to determine if a label is a correct label for a product.

Figure 3:
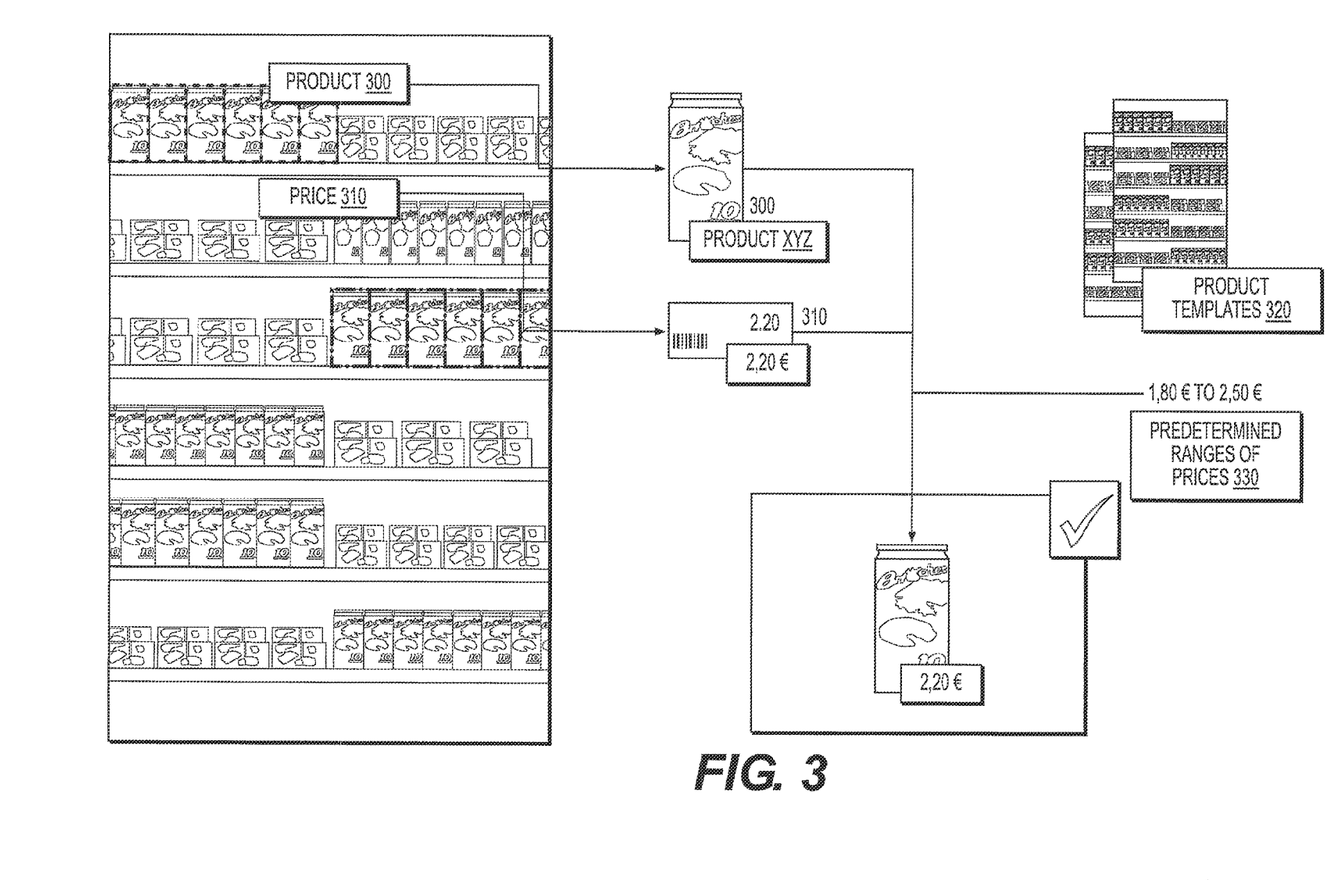
FIG. 3 illustrates an example of a product price monitoring key performance indicator, according to an embodiment.

FIG. 3 shows an example of a product and product label identified from a captured image. An identified product xyz is shown as 300. A product label proximally located to the product 300 on the shelf is also identified. OCR is performed on the product label to identify the price 310, which in this example is "2, 20 €". Previous data collection 320 may include product templates to identify the product xyz from the captured image. After the product xyz is identified, the price 310 is compared to prices in a predetermined range, shown as 330, to determine whether the label with the price 310 is the correct label. If the label is the correct label, the price 310 may be compared to a second range of prices or a second set of prices to determine whether the price 310 is the correct price. In one example, the second set of prices is a range shown as 1,80 € to 2,50 €. The price 310 falls within the range, so it is determined to be the correct price of the product xyz.

Figure 4A:
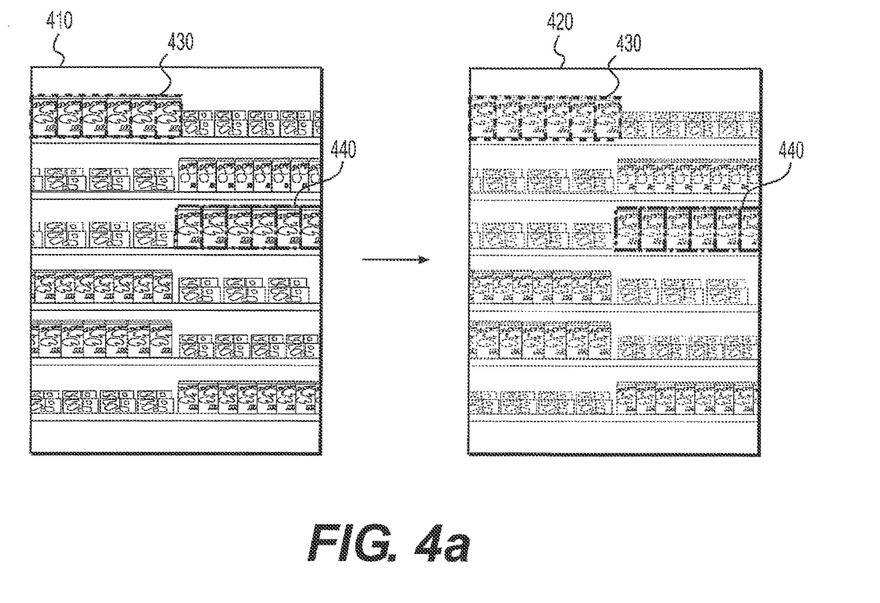
FIG. 4a illustrates an example of a realogram, according to an embodiment.
Figure 4B:
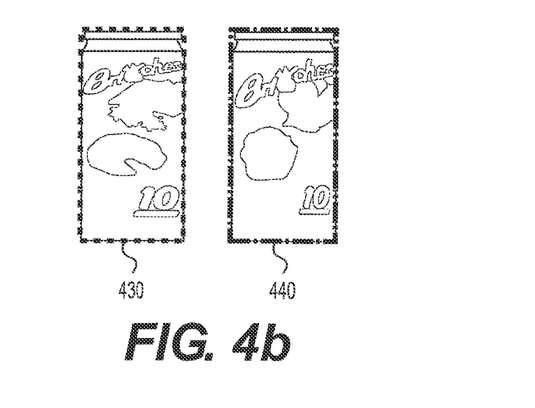
FIG. 4b illustrates an example of a product facing, according to an embodiment.

As described above, a realogram is created from the analyzed image and from one or more of the products, shelves, products prices and out-of-stocks identified from the analyzed image. FIG. 4a shows an example of a realogram. For example, image 410 is shown and corresponding realogram 420 is shown identifying the position of the identified products on the shelves. In FIG. 4a, two sets of products labeled 430 and 440, respectively, are shown in the image 410 and in the realogram 420. The set of products labeled 430 is shown as present in both the image 410 and the realogram 420. The set of products labeled 440 is also shown as present in both the image 410 and the realogram 420. Thus, the realogram 420 shows the products present in the image 410. A more detailed view of a product of the set of products 430 and a product of the set of products 440 are shown in FIG. 4b. These are front-facing views of the products.

Figure 5:
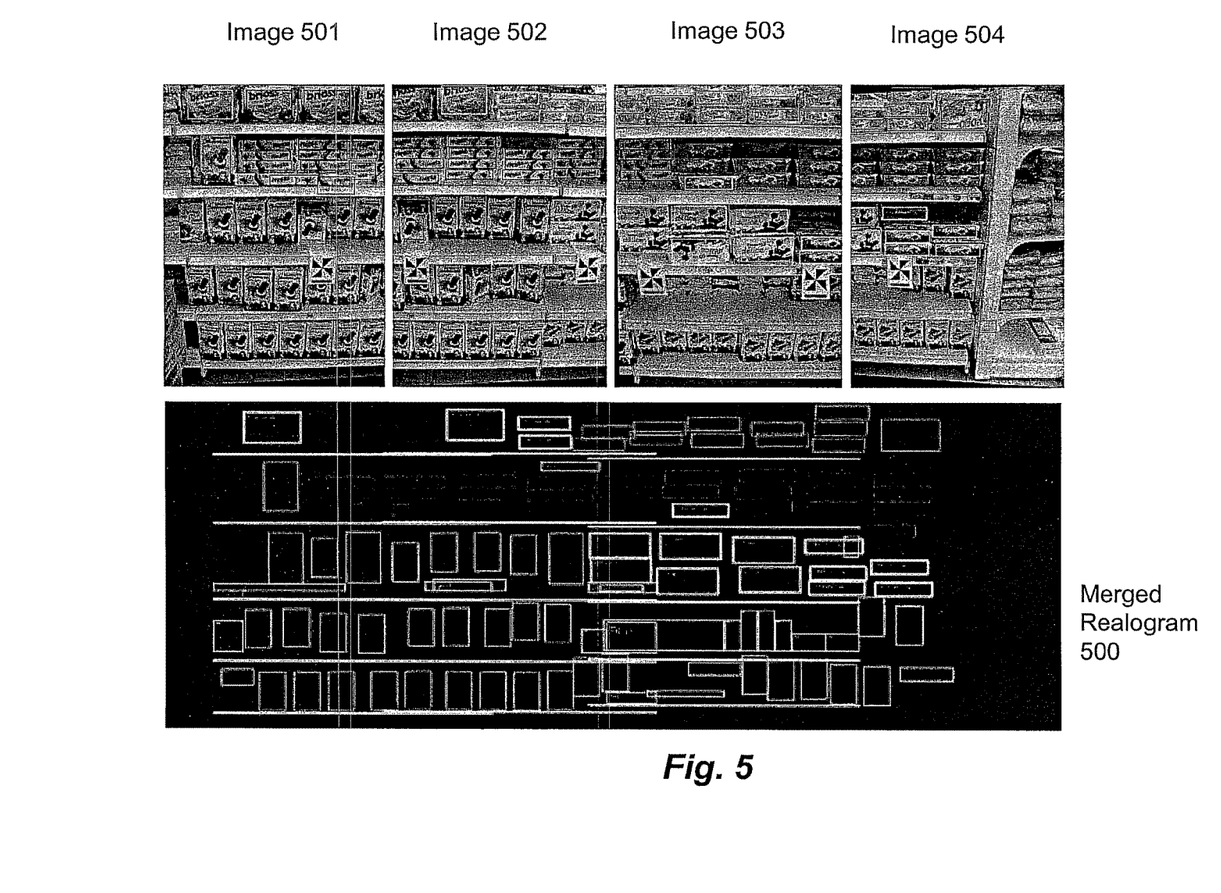
FIG. 5 illustrates an example of a merged realogram, according to an embodiment.

FIG. 5 illustrates a merged realogram 500. In case of long or wide product displays, several images of different portions of the product display are captured, such as images 501-504 of FIG. 5, and sent to the image processing server, as discussed above. The image processing server creates the merged realogram 500 as shown in FIG. 5.

Once the realogram is created at step 140 in FIG. 1, KPIs about the display layout are determined from the captured image. KPIs are measures of performance, typically used to help a company define and evaluate success of products and product displays. KPIs are also used to determine whether the products in the product display comply with requirements provided in planograms or guidelines as described below. These requirements may include orientations of products, sequences of products, etc. In many instances, if the requirements are complied with, sales volumes should improve. The KPIs are determined with different granularity, such as by SKU, by brand or by product category. KPI determination is performed in different layers according to different complexity. In addition, competitor analysis can be performed on the KPIs based on the availability of the competitor's product templates. Both quantitative and qualitative KPIs may be determined from the image captured at a point-of-sale.

Therefore, returning to FIG. 1, at step 160 of the method 100, a first layer of KPIs are determined from the images captured at the point-of-sale. The KPIs are quantitative in nature and may include at least product presence, facing quantity (number of products facing forward), share of space, assortment, shelf linear meters, and product price monitoring.

At step 180, it is determined whether a matching planogram exists. Planogram recognition is carried out by the image processing server to match the realogram to an available planogram. A planogram is, at minimum, a list of products using any convenient identification scheme, positions of the products and orientations of a surface, usually a front face, of the products. For example, a planogram may comprise a diagram of fixtures and products that graphically illustrates this data, i.e. how and where products should be displayed, usually on a product display device such as a store shelf. The planograms are collected periodically and stored in a data store of the image processing server.

If a planogram matching the realogram is found during the step 180, the process proceeds to step 200. At step 200, a second layer of KPIs describing the quality of the display is determined based on the matching planogram. The qualitative KPIs may include the shelf compliance, the planogram compliance and the competitor analysis. These are determined based on comparing the realogram with the matching planogram. The planograms represent the ideal display of one or more products as originally envisioned by a planner and it may include a list of products, number of products, and relative positions and orientations. For instance, the comparison between the realogram and the planogram may include, but are not limited to, horizontal or vertical deviations of products from their desired locations implicating the planogram compliance KPI, the failure to detect products at their expected locations implicating the shelf compliance KPI, the addition of unexpected products implicating the quality of display KPIs, competitor product interference implicating the competitor analysis KPI, etc. At step 200, a third layer of customized KPIs may also be determined if the company or other entity requests one or more different KPIs to be determined.

Figure 6:
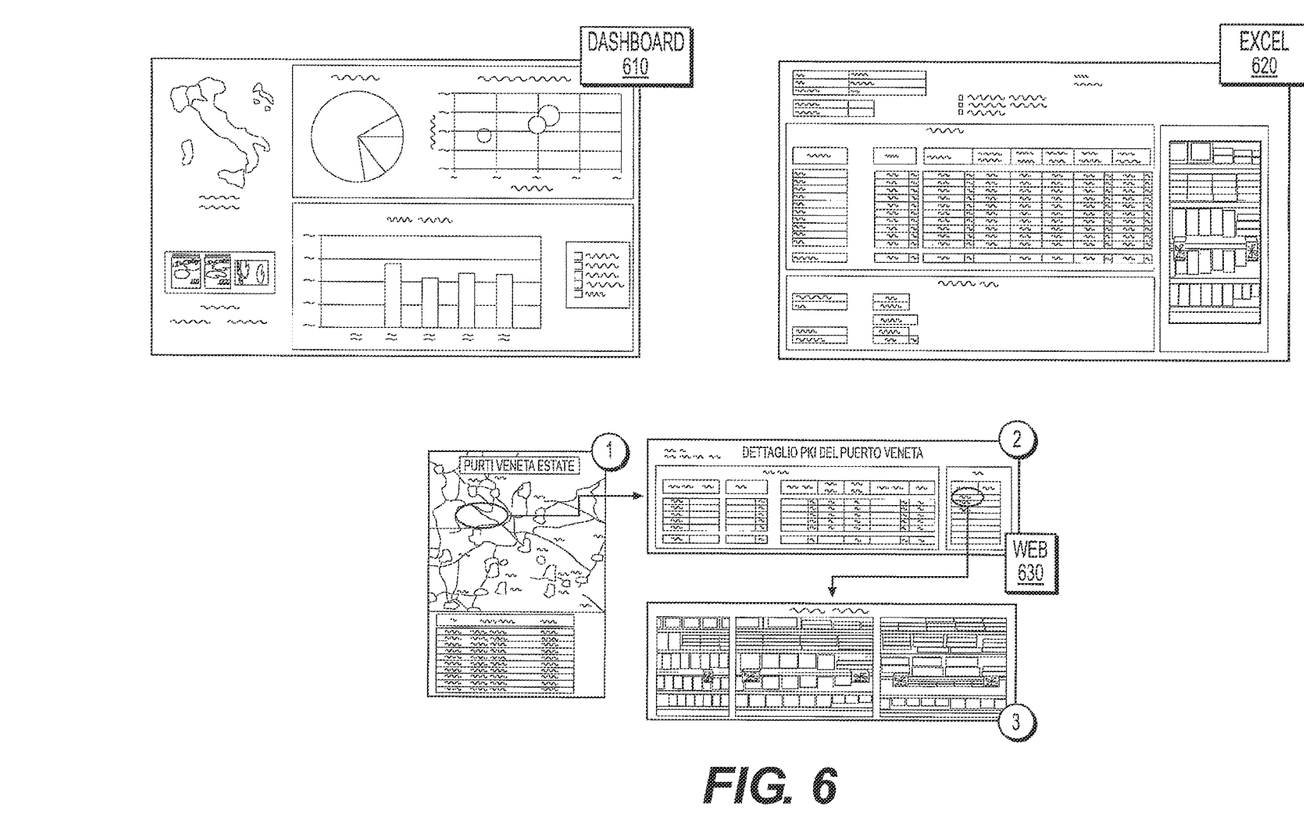
FIG. 6 illustrates publishing various key performance indicators, according to an embodiment.

At step 210, the quantitative and qualitative KPIs are published on a dashboard, website or graphical user interface (GUI). For example, FIG. 6 illustrates that the KPIs can be published to a dashboard 610, to an Microsoft Excel™ spreadsheet 620, or on a web page 630.

If, however, a matching planogram is not found at step 180, at step 220 it is determined whether matching guidelines exist. Guidelines may include requirements for products in a product display at a point-of-sale using any convenient identification scheme, positions of the products and orientations of a surface, usually a front face of the products. For example, a guideline may describe a required sequence of products on each shelf in a product display at a point-of-sale.

If matching guidelines are found at step 220, then at step 230, the second layer of KPIs is determined based on the matching guidelines. A third layer of KPIs may also be determined. The second and third layers of KPIs are described above. Then, the quantitative and qualitative KPIs are published at step 210.

If, however, matching guidelines are not found at step 220, the process still proceeds to the step 210. However, only quantitative KPIs may be published, because no qualitative KPIs were determined either from a matching planogram or matching guidelines.

Moreover, it may be desirable to instruct someone at the point-of-sale such as a stock clerk to take an action with respect to the product display, for example, to inspect the affected area and take any necessary remedial actions. For example, if a product is out-of-stock, the image processing server can send a message back to the handheld device that captured the image to reorder or re-stock the out-of-stock product. In another example, a message may be sent to the handheld device to re-orient products to face front, or to correct a price on a label. In another example, a message can be sent by the image processing server to the handheld device to recapture the image if the image is unfocused, unclear or not properly captured.

Figure 7:
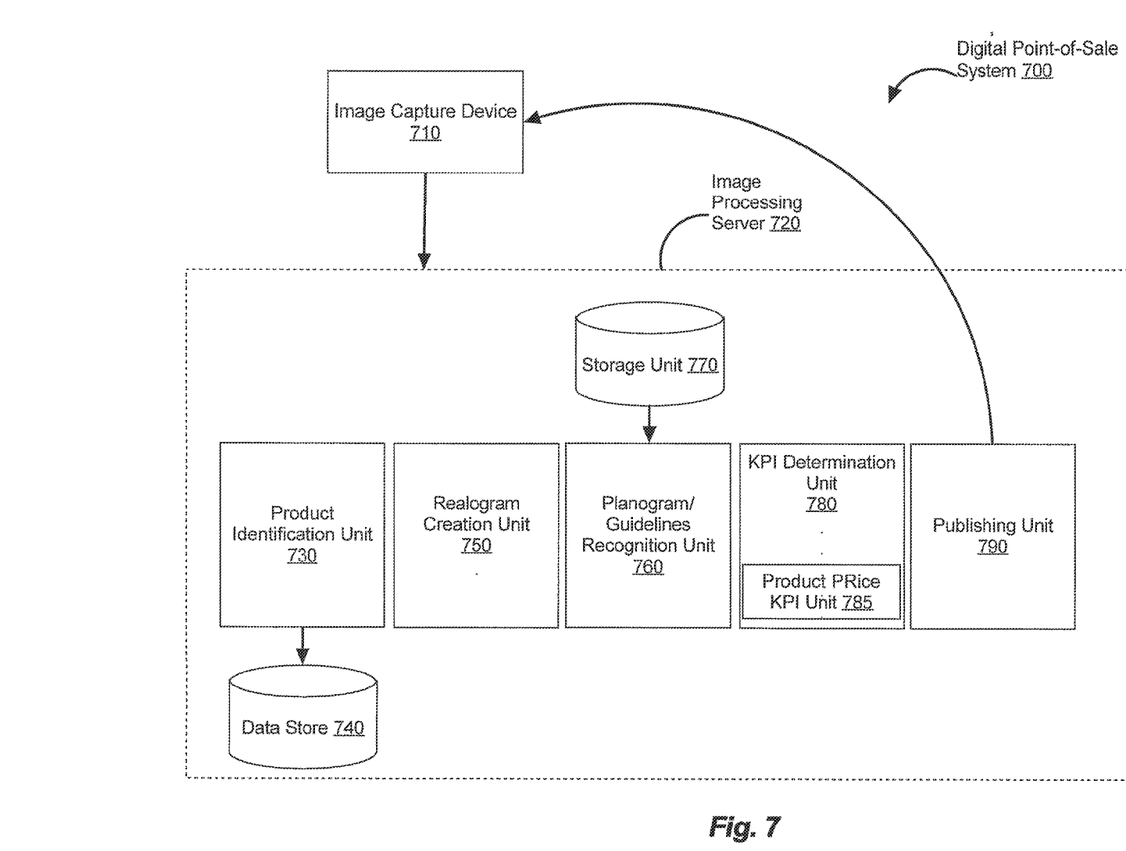
FIG. 7 illustrates a system, according to an embodiment.

FIG. 7 illustrates a digital point-of-sale system 700 that performs the methods described above. The digital point-of-sale system 700 includes image capture device 710, image processing server 720, product identification unit 730, data store 740, realogram creation unit 750, product price KPI unit 785, planogram/guidelines recognition unit 760, storage unit 770, KPI determination unit 780 and publishing unit 790.

The image capture device 710 of the digital point-of-sale system 700 captures an image of a product display at a point-of-sale, as discussed in the step 120 of method 100. Metadata including information such as point-of-sale data, GPS and an image capture date and/or time is collected as well. The captured image and the associated metadata are then sent to the image processing server 720. There may be multiple image capture devices at a multitude of locations that send captured images and associated metadata to the image processing server 720 for processing. The image processing server 720 may perform the method 100 for a plurality of captured images from a plurality of image capture devices.

The product identification unit 730 of the image processing server 720 automatically recognizes the products' positions in the product display captured in the image. The product identification unit 730 then identifies each product by determining relevant features of each product as discussed above in the step 144. Once each product is matched to an available product template from the data store 740, each product is identified.

The realogram creation unit 750 creates a realogram, which is a diagram of products, shelves and out-of-stocks positioned in a product display corresponding to the positions of the related products, shelves and out-of-stocks in the captured image, as discussed in the step 140.

Once the realogram is created, KPIs are determined by the KPI determination unit 780, as discussed in the step 160. The KPIs are measures of performance, typically used to help a company define and evaluate how successful a product is. Both quantitative and qualitative KPIs are determined from the image captured at a point-of-sale. The KPI determination unit 780 includes the product price KPI unit 785 that performs the step 150, in which product prices are recognized. In another embodiment, the product price KPI unit 785 may be located in the realogram creation unit 750.

The planogram/guidelines recognition unit 760 matches the realogram to an available planogram or guidelines, as discussed in steps 180 and 220. The planograms and guidelines are collected periodically and stored in a storage unit 770 of the image processing server. In the planogram recognition unit 760, the realogram is compared with each available planogram or guidelines from the storage unit 760 until a matching planogram or matching guidelines are found, as described above with respect to steps 180 or 200. In another embodiment, a user indicates which planogram or guidelines are for a particular point-of-sale, and the metadata for the images used to create the realogram is used to identify the matching planogram or guidelines by identifying the corresponding point-of-sale in the realogram. The metadata may be location data.

Once the matching planogram or the matching guidelines are identified, qualitative KPIs are determined based on the matching planogram in the step 200 or based on the matching guidelines in the step 230.

The publishing unit 790 publishes the quantitative and/or qualitative KPIs on a dashboard, website or graphical user interface (GUI), as discussed in the step 210. The publishing unit 790 may also publish a message on the image capture device 710 or some other device at the point-of-sale or store to instruct someone, such as a stock clerk or merchandiser, to take an action with respect to the product display, such as to inspect the affected area and take any necessary remedial actions. The publishing component is based on multichannel and multi-format engine to distribute results in different formats (textual, xml, PDF, Excel files) and through different channels (FTP, email, SMS/MMS, Web). In additional, analytics and multi-dimensional analysis are calculated and provided (on request) to customers. Note that the system 100 may be used to determine KPIs for point-of-sales in multiple stores or locations and provide the KPIs and other analysis through an interface, such as the interfaces described above with respect to FIG. 6.

Figure 8:
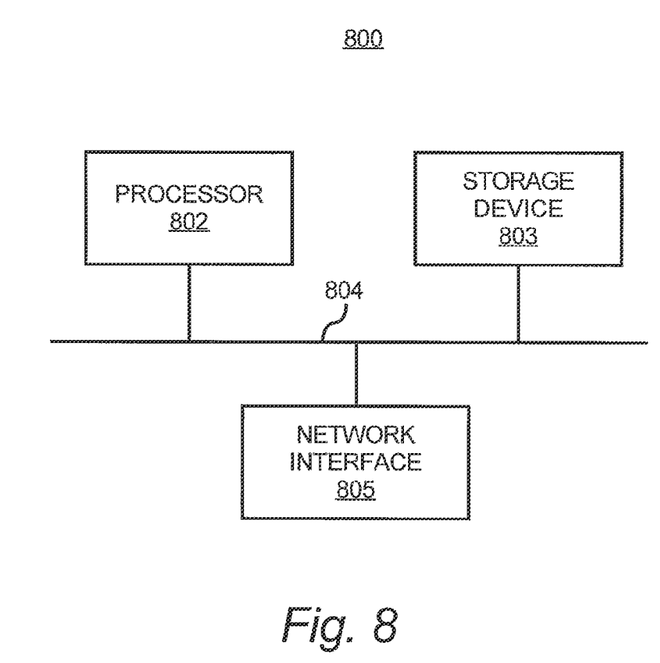
FIG. 8 illustrates a computer system, according to an embodiment.

FIG. 8 shows a computer system 800 that may be used as a hardware platform for the image processing server 720. The computer system 800 may be used as a platform for executing one or more of the steps, methods, and functions described herein that may be embodied as software stored on one or more computer readable storage devices, which are hardware storage devices.

The computer system 800 includes a processor 802 or processing circuitry that may implement or execute software instructions performing some or all of the methods, functions and other steps described herein. Commands and data from the processor 802 are communicated over a communication bus 804. The computer system 800 also includes a computer readable storage device 803, such as random access memory (RAM), where the software and data for processor 802 may reside during runtime. The storage device 803 may also include non-volatile data storage. The computer system 800 may include a network interface 805 for connecting to a network. It will be apparent to one of ordinary skill in the art that other known electronic components may be added or substituted in the computer system 800.

While the embodiments have been described with reference to examples, those skilled in the art will be able to make various modifications to the described embodiments without departing from the scope of the claimed embodiments. Also, the embodiments described herein may be used to determine KPIS for items not limited to goods for sale on shelves. For example, the system and methods described herein may be used to determine if a landscaping scheme has been correctly implemented or whether cars at a dealership have been correctly placed.

What is claimed is:

1. A digital point-of-sale system comprising:
    a hardware processor; and
    a storage device storing machine-readable instructions executed by the hardware processor to:
    receive at least one captured image of a product display, the at least one captured image including a plurality of products having one or more defined physical product features;
    analyze the at least one captured image by:
       identifying one or more shelves of the product display by analyzing a vertical and horizontal gradient of the at least one captured image, and
       identifying, using one or more of the defined physical product features for each of the plurality of products, a location of each product of the plurality of products on the one or more shelves in the at least one captured image
       identifying, for each product at the identified location, a proximally located product label from the at least one captured image;
       electronically recognizing a product price on the proximally located product label; and
       determining whether the proximally located product label is a correct label for the product at the identified location by comparing the electronically recognized product price with at least one predetermined price;
    generate a realogram from the analysis of the at least one captured image, wherein the realogram includes an electronically-generated diagram of the product display and locations of each of the plurality of products on the one or more shelves of the product display;
    compare the realogram to stored planograms to determine whether the realogram matches a stored planogram; and
    in response to the realogram matching a stored planogram, compare the realogram and the matching planogram to determine at least one of deviations of desired product locations, addition of unexpected products, and competitor product interference.

2. The digital point-of-sale system of claim 1, wherein to analyze the at least one captured image, the hardware processor is to determine a local luminance mean and a standard deviation of a local luminance for the at least one captured image, and identify products that are out-of-stock from the local luminance mean and the standard deviation of the local luminance.

3. The digital point-of-sale system of claim 1, wherein the hardware processor is to generate an output based upon the comparison of the realogram to the matching planogram, and wherein the output comprises a message that includes a remedial action with respect to the product display.

4. The digital point-of-sale system of claim 1, wherein to determine whether the realogram matches a stored planogram the hardware processor is to:
    determine from the generated realogram quantitative key performance indicators (KPIs) pertaining to a layout of the product display; and
    determine, based on the determined quantitative KPIs, whether the generated realogram matches the stored planogram, wherein the stored planogram comprises a list of products identified by product position and orientation.

5. The digital point-of-sale system of claim 4, wherein to determine at least one of the deviations of desired product locations, the addition of unexpected products, and competitor product interference, the hardware processor is to determine qualitative KPIs describing a quality of the product display based on the matching planogram, wherein the qualitative KPIs relate to shelf compliance, a planogram compliance, quality of display, and competitor analysis.

6. The digital point-of-sale system of claim 5, wherein in response to a determination that the generated realogram does not match a stored planogram, the hardware processor is to compare the realogram to matching guidelines, and determine the qualitative KPIs for the product display based on the comparison of the realogram to the matching guidelines.

7. The digital point-of-sale system of claim 4, wherein to determine the quantitative KPIs, the hardware processor is to determine whether each of the identified products is in a desired orientation, in a desired sequence, or located on a predetermined shelf.

8. The digital point-of-sale system of claim 1, wherein the at least one captured image comprises a plurality of captured images, and to generate the realogram, the hardware processor is to align and merge the plurality of captured images into a single image.

9. The digital point-of-sale system of claim 1, wherein to determine whether the proximally located product label is the correct label for the product at the identified location, the hardware processor is to determine whether the product price on the proximally located product label is within a predetermined range of prices based on historical product pricing data for the product at the identified location.

10. A method for analyzing products at a point-of-sale, the method comprising:
    receiving, by a hardware processor, at least one captured image of a product display, the at least one captured image including a plurality of products having one or more defined physical product features;
    analyzing, by the hardware processor, the at least one captured image by:
       identifying one or more shelves of the product display by analyzing a vertical and horizontal gradient of the at least one captured image; and
       identifying, using one or more of the defined physical product features for each of the plurality of products, a location of each product of the plurality of products on the one or more shelves in the at least one captured image;
       identifying, for each product of the plurality of products, a proximally located product label from the at least one captured image;

electronically recognizing a product price on the proximally located product label; and determining whether the proximally located product label is a correct label for each product by comparing the electronically recognized product price with at least one predetermined price;

generating a realograrm from the analysis of the at least one captured image, wherein the realogram includes an electronically-generated diagram of the product display and locations of each of the plurality of products on the one or more shelves of the product display;

comparing the realogram to stored planograms to determine whether the realogram matches a stored planogram; and in response to the realogram matching a stored planogram, comparing the realograrm and the matching planogram to determine at least one of deviations of desired product locations, addition of unexpected products, and competitor product interference.

11. The method of claim 10, wherein analyzing the at least one captured image includes determining a local luminance mean and a standard deviation of a local luminance for the at least one captured image, and identifying products that are out-of-stock from the local luminance mean and the standard deviation of the local luminance.

12. The method of claim 10, comprising:
generating an output based upon the comparing of the realogram to the matching planogram, and wherein generating the output includes generating a message that includes a remedial action with respect to the product display.

13. The method of claim 10, wherein comparing the realogram to the stored planograms to determine whether the realogram matches a stored planogram the hardware processor comprises:
determining, from the generated realogram, quantitative key performance indicators (KPIs) pertaining to a layout of the product display, and
determining, based on the determined quantitative KPIs, whether the generated realogram matches the stored planogram, wherein the stored planogram comprises a list of products identified by product position and orientation.

14. The method of claim 13, wherein the determining of at least one of the deviations of desired product locations, the addition of unexpected products, and competitor product interference, comprises:
determining qualitative KPIs describing a quality of the product display based on the matching planogram, wherein the qualitative KPIs relate to shelf compliance, a planogram compliance, quality of display, and competitor analysis.

15. The method of claim 14, comprising:
in response to determining that the generated realogram does not match a stored planogram, comparing the realogram to matching guidelines and determining the qualitative KPIs pertaining to the layout of the product display based on the comparison of the generated realogram to the matching guidelines.

16. The method of claim 13, wherein determining the quantitative KPIs includes determining whether each of the identified products is in a desired orientation, in a desired sequence, or located on a predetermined shelf.

17. The method of claim 10, wherein the at least one captured image comprises a plurality of captured images, and generating the realogram includes aligning and merging the plurality of captured images into a single image.

18. A non-transitory computer-readable medium comprising machine readable instructions that when executed by a processor, cause the processor to:
receive at least one captured image of a product display, the at least one captured image including a plurality of products having one or more defined physical product features;
analyze the at least one captured image by:
identifying one or more shelves of the product display by analyzing a vertical and horizontal gradient of the at least one captured image, and
identifying, using one or more of the defined physical product features for each of the plurality of products, a location of each product of the plurality of products on the one or more shelves in the at least one captured image;
identifying for each of the plurality of products, a proximally located product label from the at least one captured image;
electronically recognizing a product price on the proximally located product label; and
determining whether the proximally located product label is a correct label for the product at the identified location by comparing the electronically recognized product price with at least one predetermined price;
generate a realogram from the analysis of the at least one captured image, wherein the realogram includes an electronically-generated diagram of the product display and locations of each of the plurality of products on the one or more shelves of the product display;
compare the realogram to stored planograms to determine whether the realogram matches a stored planogram; and
in response to the realogram matching a stored planogram, compare the realogram and the matching planogram to determine at least one of deviations of desired product locations, addition of unexpected products, and competitor product interference.

19. The non-transitory computer-readable medium of claim 18, wherein to analyze the at least one image, the instructions are to cause the processor to determine a local luminance mean and a standard deviation of a local luminance for the at least one image, and identify products that are out-of-stock from the local luminance mean and the standard deviation of the local luminance.

* * * * *

UNITED STATES PATENT AND TRADEMARK OFFICE
CERTIFICATE OF CORRECTION

PATENT NO. : 10,078,826 B2
APPLICATION NO. : 14/796709
DATED : September 18, 2018
INVENTOR(S) : Simone Morandi et al.

It is certified that error appears in the above-identified patent and that said Letters Patent is hereby corrected as shown below:

In the Claims

In Column 11, Line 7, Claim 10, "realograrm" should be "realogram".
In Column 11, Line 16, Claim 10, "realograrm" should be "realogram".

Signed and Sealed this
Twentieth Day of November, 2018

Andrei Iancu
*Director of the United States Patent and Trademark Office*